(12) United States Patent
Petrovic et al.

(10) Patent No.: US 9,115,639 B2
(45) Date of Patent: Aug. 25, 2015

(54) SUPERCHARGED INTERNAL COMBUSTION ENGINE HAVING EXHAUST-GAS RECIRCULATION ARRANGEMENT AND METHOD FOR OPERATING AN INTERNAL COMBUSTION ENGINE

(71) Applicant: Ford Global Technologies, LLC, Dearborn, MI (US)

(72) Inventors: Simon Petrovic, Aachen (DE); Mark Eifert, Frankfurt am Main (DE)

(73) Assignee: Ford Global Technologies, LLC, Dearborn, MI (US)

( * ) Notice: Subject to any disclaimer, the term of this patent is extended or adjusted under 35 U.S.C. 154(b) by 388 days.

(21) Appl. No.: 13/645,340

(22) Filed: Oct. 4, 2012

(65) Prior Publication Data

US 2013/0098031 A1  Apr. 25, 2013

(30) Foreign Application Priority Data

Oct. 19, 2011  (DE) .......................... 10 2011 084 782

(51) Int. Cl.
*F02B 33/44* (2006.01)
*F02M 25/07* (2006.01)
(Continued)

(52) U.S. Cl.
CPC ................ *F02B 29/04* (2013.01); *F02B 41/00* (2013.01); *F02D 9/02* (2013.01); *F02D 41/0007* (2013.01);
(Continued)

(58) Field of Classification Search
CPC ......... F02D 41/064; F02D 43/00; F02D 9/02; F02D 41/0007; F02D 41/0055; F02D 41/12; F02D 2009/0283; F02D 2041/0017; F02B 29/04; F02B 41/00; F02B 29/0406; F02B 37/00; F02M 25/07; F02M 25/0713; F02M 25/0707; F02M 25/0727; Y02T 10/47; Y02T 10/144

USPC ........ 60/605.2, 599, 606, 612, 286, 280, 289, 60/303
See application file for complete search history.

(56) References Cited

U.S. PATENT DOCUMENTS 3,355,877 A * 12/1967 Chaffiotte ........................ 60/606
5,577,385 A * 11/1996 Kapich ........................... 60/612
(Continued)

FOREIGN PATENT DOCUMENTS

DE  4106046 A1 * 1/1992 .............. F02B 29/04
DE  102010003337 A1  9/2011
(Continued)

*Primary Examiner* — Thai Ba Trieu
(74) *Attorney, Agent, or Firm* — Julia Voutyras; Alleman Hall McCoy Russell & Tuttle LLP (57) ABSTRACT

Embodiments for an internal combustion engine having at least one cylinder, at least one exhaust line for discharging combustion gases via an exhaust-gas discharge system, and at least one intake line for supplying charge air via an intake system are provided. In one example, an internal combustion engine comprises an exhaust-gas recirculation arrangement which comprises a recirculation line which branches off from the exhaust-gas discharge system and which opens into the intake system, an exhaust-gas turbocharger comprising a compressor arranged in the intake system and a turbine arranged in the exhaust-gas discharge system, a throttle element which is arranged in the intake line downstream of the compressor, a bypass line which branches off from the intake line upstream of the throttle element and which opens into the intake line again downstream of the throttle element, and an expansion machine for gaining additional energy arranged in the bypass line.

15 Claims, 3 Drawing Sheets

(51) Int. Cl.
*F01N 5/00* (2006.01)
*F01N 3/00* (2006.01)
*F02B 29/04* (2006.01)
*F02D 41/06* (2006.01)
*F02D 41/12* (2006.01)
*F02D 43/00* (2006.01)
*F02B 41/00* (2006.01)
*F02D 9/02* (2006.01)
*F02D 41/00* (2006.01)
*F02B 37/00* (2006.01)

(52) U.S. Cl.
CPC .......... *F02D 41/0055* (2013.01); *F02D 41/064* (2013.01); *F02D 41/12* (2013.01); *F02D 43/00* (2013.01); *F02M 25/07* (2013.01); *F02M 25/0713* (2013.01); *F02B 29/0406* (2013.01); *F02B 37/00* (2013.01); *F02D 2009/0283* (2013.01); *F02D 2041/0017* (2013.01); *F02M 25/0707* (2013.01); *F02M 25/0727* (2013.01); *Y02T 10/144* (2013.01); *Y02T 10/47* (2013.01)

(56) References Cited

U.S. PATENT DOCUMENTS

| | | | |
|---|---|---|---|
| 6,094,909 A * | 8/2000 | Weber et al. | 60/280 |
| 6,334,436 B1 * | 1/2002 | Paffrath et al. | 60/599 |
| 6,883,323 B2 * | 4/2005 | Hummel | 60/606 |
| 7,779,634 B2 * | 8/2010 | Barthelet et al. | 60/607 |
| 2002/0195086 A1 | 12/2002 | Beck et al. | |
| 2009/0235661 A1 | 9/2009 | Janssen | |
| 2011/0247326 A1 | 10/2011 | Imani | |

FOREIGN PATENT DOCUMENTS

| | | | | |
|---|---|---|---|---|
| EP | 655550 A1 * | 5/1995 | | F02B 29/04 |
| GB | 2129055 A * | 5/1984 | | F02B 29/04 |
| GB | 2420152 A | 5/2006 | | |
| JP | 63295817 A * | 12/1988 | | F02B 29/04 |
| JP | 64000322 A * | 1/1989 | | F02B 29/04 |
| JP | 05079334 A * | 3/1993 | | F02B 29/04 |
| JP | 2002266650 A * | 9/2002 | | F02B 29/04 |
| JP | 2005147030 A * | 6/2005 | | F02M 25/07 |
| JP | 2006274806 A * | 10/2006 | | F01N 3/02 |
| JP | 2012013089 A * | 1/2012 | | F02B 29/04 |

* cited by examiner

SUPERCHARGED INTERNAL COMBUSTION ENGINE HAVING EXHAUST-GAS RECIRCULATION ARRANGEMENT AND METHOD FOR OPERATING AN INTERNAL COMBUSTION ENGINE

RELATED APPLICATIONS

The present application claims priority to German patent application 102011084782.0, filed on Oct. 19, 2011, the entire contents of which are hereby incorporated by reference for all purposes.

FIELD

The disclosure relates to an internal combustion engine having at least one cylinder.

BACKGROUND AND SUMMARY

In the development of internal combustion engines, it is basically sought to minimize fuel consumption and reduce pollutant emissions. In the previous systems, various measures are implemented and concepts are used to achieve said aims.

With regard to the pollutant problem, the reduction of nitrogen oxide emissions is of high relevance, in particular in the case of diesel engines. Since nitrogen oxides form due to not only an excess of air but rather also high temperatures, one concept for reducing the nitrogen oxide emissions includes reducing the combustion temperatures.

Here, exhaust-gas recirculation (EGR), that is to say the recirculation of exhaust gases from the exhaust-gas discharge system into the intake system, is expedient in achieving this aim, wherein it is possible for the nitrogen oxide emissions to be considerably reduced with increasing exhaust-gas recirculation rate. Here, the exhaust-gas recirculation rate $X_{EGR}$ is determined as follows:

$$X_{EGR} = m_{EGR}/(m_{EGR} + m_{Fresh\ air})$$

where $m_{EGR}$ denotes the mass of recirculated exhaust gas and $m_{Fresh\ air}$ denotes the fresh air which is supplied, having previously been compressed by means of a compressor, to the at least one cylinder. Within the context of the present disclosure, therefore, the charge air may also comprise recirculated exhaust gas aside from the fresh air.

To obtain a considerable reduction in nitrogen oxide emissions, high exhaust-gas recirculation rates are utilized which may be of the order of magnitude of $x_{EGR} \approx 60\%$ to $70\%$. According to the prior systems, to adjust the exhaust-gas quantity to be recirculated, that is to say the recirculation rate, a control element, also referred to as an EGR valve, is provided in the recirculation line. Exhaust-gas recirculation may also be utilized for reducing the emissions of unburned hydrocarbons.

Internal combustion engines may be equipped not only with at least one exhaust-gas recirculation arrangement but rather also with at least one exhaust-gas turbocharger which comprises a compressor arranged in the intake system and a turbine arranged in the exhaust-gas discharge system.

Supercharging is primarily a method for increasing performance, wherein the air for the combustion process in the engine is compressed, as a result of which the fuel mass supplied and the mean effective pressure can be increased. By means of supercharging, it is possible not only for the power of the internal combustion engine to be increased while maintaining an unchanged swept volume, but rather also for the swept volume of the internal combustion engine to be reduced while maintaining the same power. Supercharging basically leads to an increased specific power and to a more favorable power-to-weight ratio. For the same vehicle boundary conditions, it is thus possible by means of supercharging for the load collective to be shifted toward higher loads, at which the specific fuel consumption is lower.

Supercharging consequently assists in the constant efforts in the development of internal combustion engines to minimize fuel consumption, that is to say to improve the efficiency of the internal combustion engine.

In an exhaust-gas turbocharger, a compressor and a turbine are arranged on the same shaft. The hot exhaust-gas flow is supplied to the turbine via an exhaust line and expands in said turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it via the intake line, as a result of which supercharging of the at least one cylinder is obtained. A charge-air cooler is often provided downstream of the compressor, by means of which charge-air cooler the compressed charge air is cooled before it enters the combustion chamber, and therefore the density of the cylinder charge is increased.

The advantage of an exhaust-gas turbocharger for example in relation to a mechanical charger is that no mechanical connection for transmitting power exists or is used between the charger and internal combustion engine. While a mechanical charger draws the energy for driving it from the internal combustion engine, the exhaust-gas turbocharger utilizes the energy of the hot exhaust gases produced by the internal combustion engine.

Supercharging may also be used to reduce pollutant emissions. With targeted configuration of the supercharging for example of a diesel engine, the nitrogen oxide emissions can be reduced without any losses in efficiency. The hydrocarbon emissions can be favorably influenced at the same time. The emissions of carbon dioxide, which correlate directly with fuel consumption, likewise decrease with falling fuel consumption.

Accordingly, embodiments are disclosed herein that relate to harvesting excess energy from the engine that may otherwise be wasted, thus improving engine efficiency. In one example embodiment, an internal combustion engine having at least one cylinder, at least one exhaust line for discharging combustion gases via an exhaust-gas discharge system, and at least one intake line for supplying charge air via an intake system comprises at least one exhaust-gas recirculation arrangement which comprises a recirculation line which branches off from the exhaust-gas discharge system and which opens into the intake system; at least one exhaust-gas turbocharger comprising a compressor arranged in the intake system and a turbine arranged in the exhaust-gas discharge system; a throttle element which is arranged in the at least one intake line downstream of the compressor; a bypass line which branches off from the at least one intake line upstream of the throttle element and which opens into the at least one intake line again downstream of the throttle element; and an expansion machine for gaining additional energy arranged in the bypass line.

In the internal combustion engine according to the disclosure, an expansion machine is provided in the intake system, that is to say on the inlet side of the internal combustion engine. The expansion machine utilizes the energy bound in the compressed charge air in order to increase the power output of the internal combustion engine in the overall balance if the operation of the internal combustion engine permits this, is suitable for this or if there is a demand for additional energy. The over-run mode of the internal combustion engine is an example of an operating state which is suitable for the use of the expansion machine to gain additional energy which would otherwise remain unutilized.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
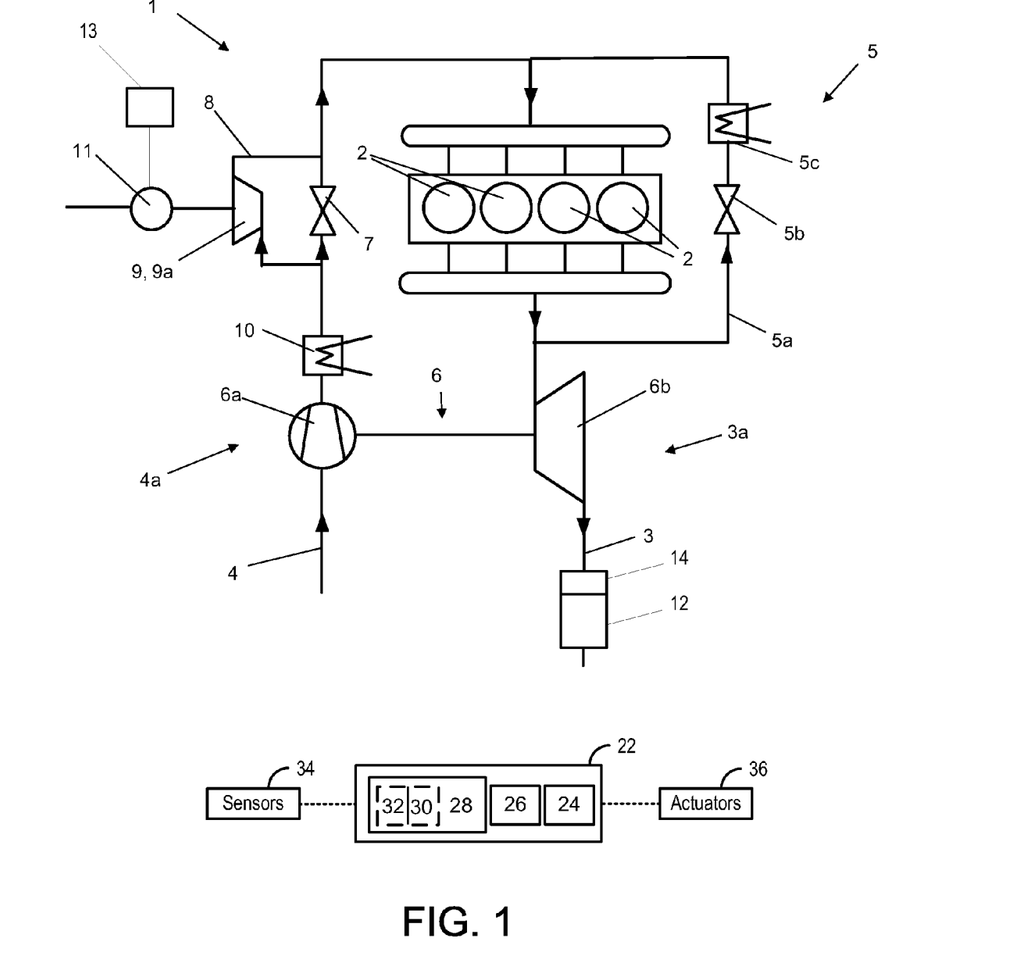
FIG. 1 schematically shows an embodiment of the internal combustion engine.

To increase engine efficiency, an expansion machine, such as a turbine, may be positioned in a bypass path of the intake leading to the engine. During certain conditions, some or all of the intake air may be routed through the turbine by adjusting a bypass throttle valve in the intake. The turbine may be coupled to a generator such that the energy from the intake may be used to drive the turbine and generate electricity via the generator. Routing air through the turbine may be performed during an over-run mode of the engine, for example, in which the air inducted into the cylinders is not combusted. By routing the intake air to the engine via the turbine during the over-run mode, extra energy may be produced that would otherwise be wasted. Further, the pumping losses associated with closing the bypass throttle, which may offset the energy gains of operating the turbine under normal conditions, may be advantageously used to assist in decelerating the engine during the over-run mode. FIG. 1 is an engine including an intake turbine, bypass throttle, and a control system configured to carry out the method of FIG. 2.

The charge-air flow conducted through the expansion machine may be adjusted by means of a throttle element (e.g., bypass throttle). The throttle element may be a valve or a throttle flap and may be adjustable, in two-stage switchable fashion or else in continuously variable fashion, between an open position and a closed position. Examples are advantageous in which the throttle element can be electrically, hydraulically, pneumatically, mechanically or magnetically controlled, preferably by means of an engine controller.

The expansion machine extracts energy from the compressed charge air, which energy is provided for further utilization, for example to the crankshaft of the internal combustion engine, or else can be used for directly driving auxiliary assemblies. The energy balance or the efficiency of the internal combustion engine is thereby improved. While maintaining the same fuel consumption, the power or energy output of the internal combustion engine is increased.

According to the prior systems, when a certain rotational speed or load is undershot, that is to say when a certain exhaust-gas quantity is undershot, there is a noticeable torque drop. This effect is undesirable. Said torque drop is understandable if one takes into consideration that the charge pressure ratio is dependent on the turbine pressure ratio. In the case of a diesel engine, for example, if the engine rotational speed is reduced, this leads to a smaller exhaust-gas mass flow and therefore to a lower turbine pressure ratio. This has the result that, toward lower rotational speeds, the charge pressure ratio likewise decreases, which equates to a torque drop.

The torque characteristic of a supercharged internal combustion engine may be improved through various measures, for example by means of a small configuration of the turbine cross section and simultaneous exhaust-gas blow-off if the exhaust-gas flow exceeds a predefinable exhaust-gas flow. Such a turbine is also referred to as a wastegate turbine. A turbine with variable turbine geometry permits an adaptation of the turbine geometry or of the effective turbine cross section to the respective operating point of the internal combustion engine, such that regulation of the turbine geometry can be performed with regard to low and high rotational speeds and also for low and high loads.

Also advantageous, therefore, are examples of the internal combustion engine in which the turbine of the at least one exhaust-gas turbocharger is equipped with a variable turbine geometry, and examples in which the turbine is a wastegate turbine, that is to say has a bypass line via which exhaust gas can be conducted past the turbine.

The torque characteristic of a supercharged internal combustion engine may furthermore be improved by virtue of a plurality of turbochargers or turbines being connected in parallel or in series. The associated compressors may be arranged in series or in parallel in the intake system. For this reason, examples of the internal combustion engine are also advantageous in particular in which at least two exhaust-gas turbochargers are provided.

Examples of the internal combustion engine are advantageous in which the expansion machine is an additional turbine. A turbine, owing to the continuous throughflow, has a relatively high efficiency, in particular in relation to a piston machine. Furthermore, separately installable turbines for automotive engineering applications are available, and there is adequate knowledge of the use of such expansion machines in internal combustion engines.

The arrangement according to the disclosure of the additional turbine on the inlet side of the internal combustion engine yields numerous advantages, in particular in relation to an arrangement on the hot exhaust-gas side. The production costs for the turbine are lower because the thermal loading of the turbine or of the turbine housing is significantly lower than on the exhaust-gas side, such that no expensive—often nickel-containing—materials need be used, and instead sheet metal or aluminum can be used. Not only the material costs themselves are lower but also the costs for machining said materials.

Furthermore, it is possible with little outlay for the shaft of a turbine to be connected, for the purpose of transmitting or outputting power, to the crankshaft of the internal combustion engine. For this reason, too, in the case of internal combustion engines with a crankshaft, examples are advantageous in which the expansion machine or turbine is or can be connected, for the purpose of outputting power, to said at least one crankshaft.

Examples of the internal combustion engine are however also advantageous in which the expansion machine is or can be connected, for the purpose of outputting power, to a generator. The electrical current provided by the generator may be utilized or stored in a variety of ways. For example, the electrical current may be used for driving auxiliary assemblies, for relieving the alternator of load, or, as will be described further below in conjunction with the method according to the disclosure, for heating up the exhaust gas or an exhaust-gas aftertreatment system in the warm-up phase.

Examples of the internal combustion engine are advantageous in which a charge-air cooler is provided in the intake system downstream of the compressor and upstream of the point at which the bypass line branches off from the at least one intake line. The charge-air cooler lowers the air temperature and thereby increases the density of the air, as a result of which the cooler or the cooling arrangement contributes to improved charging of the at least one cylinder with air, that is to say to a greater air mass in the cylinder.

Examples of the internal combustion engine are advantageous in which the recirculation line of the at least one exhaust-gas recirculation arrangement branches off from the exhaust-gas discharge system upstream of the turbine and opens into the intake system downstream of the compressor. Here, examples of the internal combustion engine are advantageous in which the recirculation line opens into the intake system downstream of the point at which the bypass line opens into the at least one intake line again.

In the present embodiment, the exhaust-gas to be recirculated is extracted from the exhaust-gas discharge system upstream of the turbine by means of high-pressure EGR. Since the exhaust gas upstream of the turbine is generally untreated, that is to say contains the untreated emissions of the internal combustion engine, the recirculated exhaust gas is preferably introduced into the intake system downstream of the compressor and downstream of a charge-air cooler which may be provided, such that the compressor and the charge-air cooler are not contaminated.

The exhaust gas is at a high pressure upstream of the turbine, such that the pressure gradient, which provides for recirculation, between the exhaust-gas side and the inlet side can be ensured. On the other hand, the recirculated exhaust gas is no longer available for driving the turbine.

In the operation of an internal combustion engine with exhaust-gas turbocharging and high-pressure EGR, there is inevitably a conflict because an increase in the exhaust-gas recirculation rate simultaneously results in a decrease of the exhaust-gas flow conducted through the turbine. The reduced exhaust-gas mass flow through the turbine leads to a reduced turbine pressure ratio or charge pressure ratio, which is equivalent to a reduced charge pressure. Further disadvantages may arise with regard to the surge limit of the compressor and the pollutant emissions.

For the reasons stated above, examples of the internal combustion engine are advantageous in which the recirculation line of the at least one exhaust-gas recirculation arrangement branches off from the exhaust-gas discharge system downstream of the turbine and opens into the intake system upstream of the compressor, that is to say for exhaust-gas recirculation, a so-called low-pressure EGR arrangement is used by means of which—in particular in the part-load range—high charge pressures can be realized with simultaneously high exhaust-gas recirculation rates.

In contrast to high-pressure EGR arrangements, in which exhaust gas is extracted from the exhaust-gas discharge system upstream of the turbine and introduced into the intake system downstream of the compressor, it is the case in low-pressure EGR arrangements that exhaust gas which has already flowed through the turbine is recirculated to the inlet side, because the low-pressure EGR arrangement comprises a return line which branches off from the exhaust line downstream of the turbine and opens into the intake line upstream of the compressor.

The exhaust gas which is recirculated via the low-pressure EGR arrangement to the inlet side is mixed with fresh air upstream of the compressor. The mixture of fresh air and recirculated exhaust gas produced in this way forms the charge air which is supplied to the compressor and compressed, wherein the compressed charge air is advantageously cooled, downstream of the compressor, in the charge-air cooler.

Here, the fact that exhaust gas is conducted through the compressor during the course of the low-pressure EGR is not detrimental, because exhaust gas is preferably used which has been subjected to exhaust-gas aftertreatment, in particular in the particle filter, downstream of the turbine. There is therefore generally no risk of depositions in the compressor which change the geometry of the compressor, in particular the flow cross sections, and thereby impair the efficiency of the compressor.

Examples of the internal combustion engine are advantageous in which both a low-pressure EGR arrangement and also a high-pressure EGR arrangement are provided.

Examples of the internal combustion engine are advantageous in which a cooling device is provided in the recirculation line of the at least one exhaust-gas recirculation arrangement in order to cool the exhaust gas to be recirculated.

The cooling device lowers the temperature in the hot exhaust-gas flow and thereby increases the density of the exhaust gases. The temperature of the cylinder fresh charge or of the charge air which is formed upon the mixture of the fresh air with the recirculated exhaust gases is hereby lowered further, as a result of which the EGR cooler also contributes to improved charging of the at least one cylinder with fresh mixture.

Examples of the internal combustion engine are advantageous in which a control element is provided in the recirculation line of the at least one exhaust-gas recirculation arrangement in order to adjust the flow rate of the exhaust gas to be recirculated.

The control element which serves as an EGR valve is preferably arranged in the recirculation line downstream of the EGR cooling device, such that an already-cooled exhaust-gas flow flows through the control element.

An EGR valve provided downstream of the cooling device is thermally less highly loaded, such that it is possible if appropriate to dispense with cooling of the EGR valve or to use less temperature-resistant and therefore cheaper materials to produce the valve.

Examples of the internal combustion engine may however also be advantageous in which the control element which serves as an EGR valve is arranged in the recirculation line upstream of the EGR cooling device.

A control element provided upstream of the cooling device prevents the cooling device from being acted on with hot exhaust gas continuously, that is to say even in operating states in which no exhaust gas is recirculated via the recirculation line into the intake system. It should be taken into consideration here that the supply of exhaust gas into the cooling device leads to contamination of the cooling device, and a control element provided upstream of the cooling device, when said control element is in the closed state, can prevent said cooling device from being acted on with exhaust gas and therefore contaminated.

Since a control element which is provided upstream of the cooling device is acted on out of principle by the non-cooled, that is to say hot exhaust gas, it may be advantageous to cool said control element.

Examples of the internal combustion engine are advantageous in which at least one exhaust-gas aftertreatment system, that is to say an oxidation catalytic converter, a storage catalytic converter, a particle filter and/or a three-way catalytic converter, is arranged in the exhaust-gas discharge system downstream of the turbine of the at least one exhaust-gas turbocharger.

Examples of the internal combustion engine are advantageous in which, in the exhaust-gas discharge system, there is provided at least one exhaust-gas aftertreatment system which is equipped with an electric heating device which utilizes the energy gained by means of the expansion machine.

Many exhaust-gas aftertreatment systems are configured to reach a minimum temperature in order to be able to exhibit adequate conversion of pollutants. An oxidation catalytic converter or a storage catalytic converter, for example, utilizes a minimum temperature of 200° C. or 300° C. respectively.

In the previous systems, the exhaust gas is often enriched with unburned hydrocarbons by means of a post-injection, wherein the fuel which is introduced is burned in order to increase the exhaust-gas temperature. Internal combustion engines which make use of a post-injection are however inherently highly susceptible to oil thinning. Furthermore, fuel consumption is increased, as a result of which efficiency is decreased.

In this respect, exhaust-gas aftertreatment systems are advantageous which have an electric heating device. This is the case in particular if said heating device is fed with energy which is additionally gained according to the disclosure by means of an expansion machine in the intake system.

Examples of the internal combustion engine are advantageous in which the charge-air cooler or EGR cooler is liquid-cooled. It is fundamentally possible for the cooling arrangement to be designed, according to the principle of a heat exchanger, in the form of an air cooling arrangement or a liquid cooling arrangement. In the case of the air cooling arrangement, the gas flow conducted through the cooler is cooled by means of an air flow which results from the relative wind and/or which is generated by a blower. In contrast, the liquid cooling arrangement necessitates the formation of a cooling circuit, if appropriate using an already existing circuit, for example the engine cooling circuit of a liquid-cooled internal combustion engine. Here, the coolant is fed by means of a pump arranged in the cooling circuit, such that said coolant circulates and flows through the cooler. The heat dissipated from the charge air to the coolant in the cooler is conducted away, and extracted from the coolant again in another heat exchanger.

On account of the significantly higher heat capacity of a liquid in relation to air, it is possible for significantly greater heat quantities to be dissipated by means of liquid cooling than is possible with air cooling. For this reason, in particular in the case of supercharged internal combustion engines with exhaust-gas recirculation, it is advantageous for liquid cooling to be used, because the heat quantity to be dissipated may be relatively large.

Examples are advantageous in which the internal combustion engine is equipped with a liquid-cooling arrangement because a supercharged internal combustion engine with exhaust-gas recirculation is thermally particularly highly loaded and therefore places increased demands on the cooling arrangement.

Examples of the internal combustion engine are advantageous in which a direct injection is carried out for introducing fuel. In addition to the use of a variable valve drive, the direct injection of fuel is, in particular in the case of the spark-ignition engine working process, a suitable measure for reducing throttling losses and therefore reducing fuel consumption.

Examples of the internal combustion engine are advantageous in which an ignition device is provided for initiating an applied ignition by means of the engine controller. Examples are however also advantageous in which the internal combustion engine is a diesel engine.

A method for operating an internal combustion engine of an above-specified type is achieved by means of a method wherein the throttle element is adjusted in the direction of a closed position in order to increase the charge-air flow being conducted through the expansion machine.

That which has been stated in connection with the internal combustion engine according to the disclosure likewise applies to the method according to the disclosure. Reference is made in particular to the method features which have been discussed during the description of the internal combustion engine, and the actuation of the throttle element and of the control element as a function of the present operating state of the internal combustion engine.

As a result of the adjustment of the throttle element in the direction of the closed position, the flow resistance of that line portion of the intake system in which the throttle element is arranged is increased, as a result of which a greater charge-air fraction flows through the expansion machine, which itself however also constitutes a flow resistance for the charge-air flow.

Method variants are basically advantageous in which the throttle element is not fully closed, such that a part of the charge air always flows through the throttle element in all operating states. Method variants are advantageous in which the throttle element is adjusted in continuously variable fashion.

Method variants are advantageous in particular in which, in the over-run mode of the internal combustion engine, through adjustment of the throttle element, the predominant fraction of the charge air is conducted through the expansion machine. That is, during the over-run mode, the throttle element is adjusted to that at least 50% of the charge air is routed to the intake via the expansion machine.

In the over-run mode, in which the fuel supply is preferably interrupted and only fresh air and/or exhaust gas is supplied to the at least one cylinder, the expansion machine also functions as an engine brake because the charge air may be sucked through the expansion machine, which noticeably increases the pumping losses, that is to say the charge exchange losses.

The kinetic energy which, in the previous systems, is lost during the over-run mode is, according to the disclosure, utilized in the expansion machine of the intake system.

In the case of internal combustion engines in which a control element is provided in the recirculation line of the at least one exhaust-gas recirculation arrangement, method variants are advantageous which are characterized in that the control element is opened in the over-run mode.

The open control element together with a throttle element which has been adjusted in the direction of the closed position serve to provide an increased pressure gradient between the exhaust-gas discharge system and the intake system, and therefore a high exhaust-gas recirculation rate during the over-run mode. A high flow rate of hot recirculated exhaust gas ensures that the internal combustion engine does not cool down, or cools down to a lesser extent, during the over-run mode. Said measure has an advantageous effect on the pollutant emissions, in particular on the emissions of unburned hydrocarbons and carbon monoxide, if the internal combustion engine is switched back to fired operation again subsequently to the over-run mode.

That which has been stated for the over-run mode of the internal combustion engine also applies analogously to a braking mode of the internal combustion engine.

Method variants are advantageous in which, in the warm-up phase of the internal combustion engine, through adjustment of the throttle element, the predominant fraction of the charge air is conducted through the expansion machine.

The energy gained by means of the expansion machine can advantageously be utilized during the warm-up phase for heating the exhaust gas, the oil, the coolant or the internal combustion engine itself, for example the cylinder head, or else for heating an exhaust-gas aftertreatment system.

The friction in the consumers which are supplied with oil, for example the crankshaft bearings, is defined significantly by the viscosity and therefore the temperature of the oil which is provided, and said friction contributes to the fuel consumption of the internal combustion engine.

Heating of the engine oil during the warm-up phase of the internal combustion engine ensures a fast decrease in viscosity, and therefore a reduction in friction and friction losses.

With regard to the heating of an exhaust-gas aftertreatment system, reference is made to the statements made in conjunction with the internal combustion engine according to the disclosure.

In the case of internal combustion engines in which the expansion machine is connected, for the purpose of outputting power, to a generator, method variants are advantageous wherein, in the warm-up phase of the internal combustion engine, the electrical current generated by means of the generator is utilized at least also for heating the exhaust gas. Here, the heating of the exhaust gas may be realized indirectly, and advantageously through the heating of an exhaust-gas aftertreatment system.

FIG. 1 shows a first embodiment of the internal combustion engine 1 in the exemplary form of a four-cylinder in-line engine which has four cylinders 2 arranged in a row. Within the context of the present disclosure, the expression "internal combustion engine" encompasses diesel engines and spark-ignition engines and also hybrid internal combustion engines.

The internal combustion engine 1 has an intake system 4a via which charge air, that is to say fresh air possibly mixed with recirculated exhaust gas, is supplied to the cylinders 2, and has an exhaust-gas discharge system 3a for discharging the exhaust gases.

The internal combustion engine 1 is equipped with an exhaust-gas recirculation arrangement 5 by means of which exhaust gas can be recirculated from the exhaust-gas discharge system 3a into the intake system 4a. The exhaust-gas recirculation arrangement 5 comprises a recirculation line 5a which branches off from the exhaust-gas discharge system 3a and opens into the intake system 4a, wherein in the recirculation line 5a there is provided a cooling device 5c for cooling the exhaust gas to be recirculated and a control element 5b (e.g., EGR valve) for adjusting the exhaust-gas quantity to be recirculated.

The internal combustion engine 1 is furthermore equipped, for supercharging, with an exhaust-gas turbocharger 6, the compressor 6a of which is arranged in an intake line 4 of the intake system 4a and the turbine 6b of which is arranged in an exhaust line 3 of the exhaust-gas discharge system 3a. Downstream of the turbine 6b is an exhaust gas treatment device 12, such as an oxidation catalyst, lean NOx trap, or other suitable exhaust gas treatment device. The exhaust gas treatment device may include a heating device 14 that may be activated to heat the treatment device. However, in some embodiments, the heating device may be coupled to the exhaust line 3 to directly heat the exhaust gas.

A charge-air cooler 10 is provided in the intake system 4a downstream of the compressor 6a, which charge-air cooler lowers the temperature of the charge air and increases the density.

The recirculation line 5a of the exhaust-gas recirculation arrangement 5, which recirculation line in the present case branches off from the exhaust-gas discharge system 3a upstream of the turbine 6b, opens out into the intake system 4a again downstream of the compressor 6a. The exhaust-gas recirculation arrangement 5 of the internal combustion engine 1 illustrated in FIG. 1 is thus a high-pressure EGR arrangement 5.

A throttle element 7 is provided in the intake line 4 of the intake system 4a downstream of the charge-air cooler 10, wherein a bypass line 8 branches off from the intake line 4 upstream of the throttle element 7, which bypass line opens into the intake line 4 again downstream of the throttle element 7.

In the bypass line 8 there is arranged an expansion machine 9, in the present case in the form of an additional turbine 9a, for gaining additional energy, wherein the charge-air flow conducted through the expansion machine 9 is adjusted by means of a throttle element 7.

The expansion machine 9 is connected, for the purpose of outputting power, to a generator 11, the electrical current of which can, in the warm-up phase of the internal combustion engine 1, be utilized also for heating the exhaust gas. The generator 11 may coupled to the vehicle power grid, battery, or other suitable energy storage device 13.

A control system 22 may regulate various aspects of the engine 1. The control system 22 includes, in particular, a processor 24, a memory 26, and a control unit 28, the processor 24 being set up to execute the methods described herein according to instructions stored in the memory 26. In addition, the control system 22 includes suitable inputs 30 for capturing input variables, such as one or more engine sensors 34. Example sensors include but are not limited to engine temperature, mass air flow, crankshaft position, etc. Furthermore, the control system 22 includes outputs 32 for activating various actuating elements, such as engine actuators 36. Example actuators include but are not limited to throttle element 7 and control element 5b. The control system 22 may be, in particular, a part of an electronic engine management system.

Figure 2:
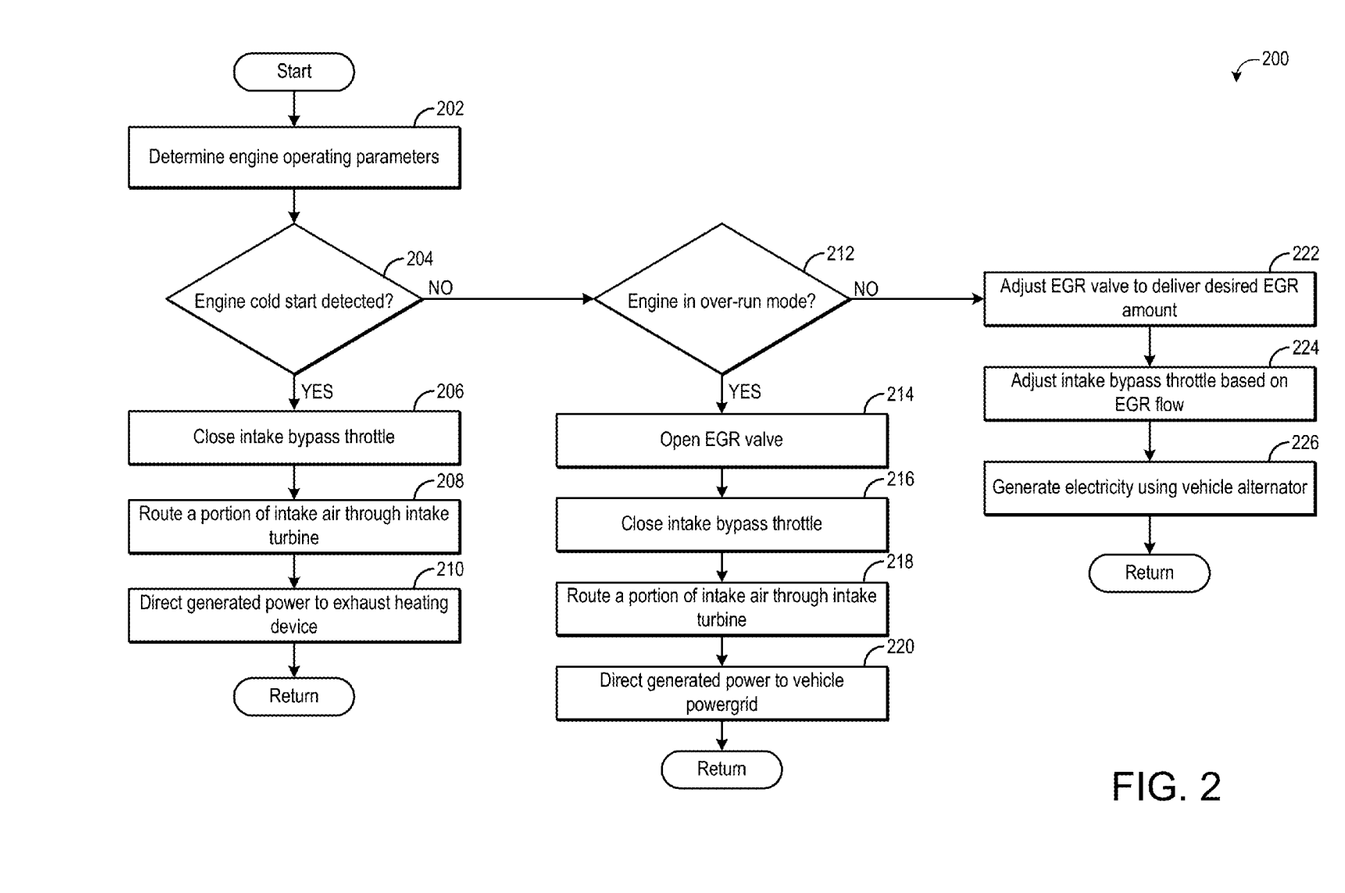
FIG. 2 is a flow chart illustrating a method for harnessing energy from the intake air according to an embodiment of the present disclosure.
Figure 3:
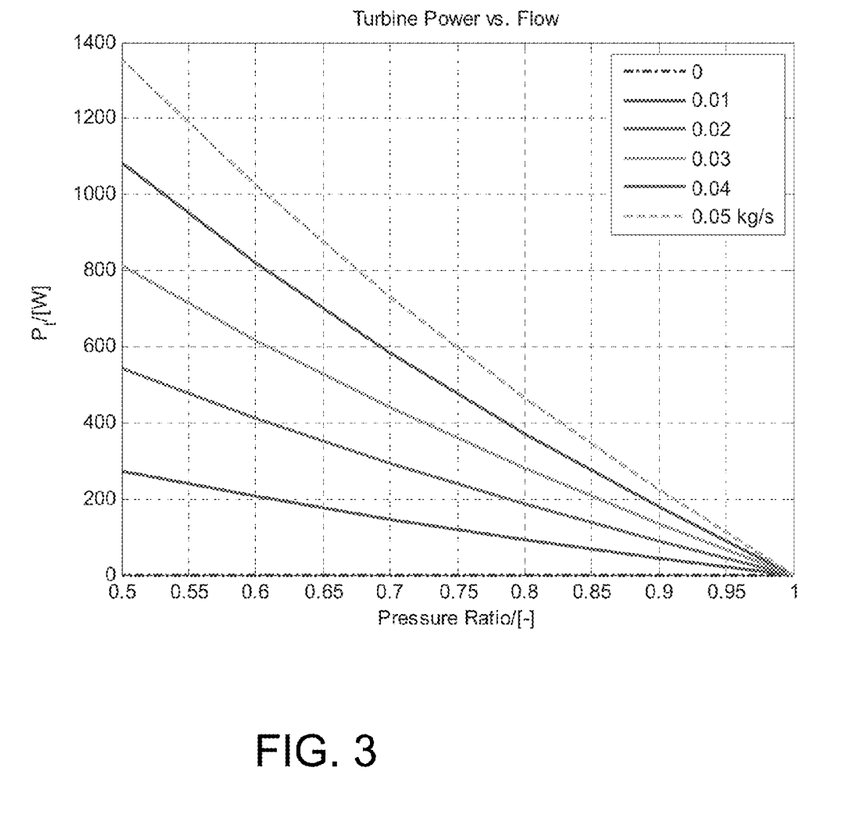
FIG. 3 is a map of turbine power versus flow.

FIG. 2 illustrates a method 200 for harnessing energy from an engine. Method 200 may be carried out by an engine control system, such as control system 22. Method 200 includes, at 202, determining engine operating parameters. The engine operating parameters determined may include engine temperature, speed, load, time since an engine start, exhaust gas temperature, etc. At 204, it is determined if the engine is operating in a cold start condition. An engine cold start may include an engine start when the temperature of the engine is at ambient temperature. A cold start may be indicated based on an amount of time since the engine was started and/or the temperature of the engine being below a desired operating temperature.

If the engine is not operating with cold start conditions, method 200 proceeds to 212, which will be explained in more detail below. If the engine is operating with cold start conditions, method 200 proceeds to 206 to close a bypass throttle valve (such as throttle element 7 of FIG. 1) positioned in the intake of the engine. The bypass throttle valve may direct intake air to the engine when open. When closed, the air may be routed via an intake turbine (such as expansion machine 9 of FIG. 1) on its way to the engine. By closing the bypass throttle valve, some or all of the intake air may pass through an intake turbine. The intake air may expand in the turbine, driving a generator coupled to the turbine. Thus, at 208, method 200 includes routing a portion of the intake air through the intake turbine. The amount of air routed through the turbine may be a function of the position of the bypass throttle valve. The bypass throttle valve may be an on/off valve configured only to be fully open or fully closed, or it may be a continuously variable valve configured to be set to a plurality of restriction levels. The amount the bypass valve is opened may be a function of engine temperature (e.g., the lower the temperature, the more open the bypass throttle) or other suitable factor.

The intake turbine may drive a generator in order to generate electricity that may be used by one or more engine electrical components, or may be stored in an energy storage device. When the engine is operating with cold start conditions, the exhaust gas produced by the engine may be of a relatively low temperature, and may be cooler than a desired operating temperature for a downstream exhaust gas treatment device. Thus, the energy generated by directing air through the intake turbine may be directed to a heating device to heat the exhaust gas, as indicated at 210. To direct energy to the heating device, energy produced by the generator may be directed to a vehicle power grid where it may be used to power the heating device. The heating device may be a suitable device that heats an exhaust gas treatment device or directly heats the exhaust gas.

Returning to 204, if the engine is not operating with cold start conditions, method 200 proceeds to 212 to determine if the engine is operating in an over-run mode. The over-run mode, also referred to as deceleration fuel shut-off (DFSO), may be initiated when the engine is decelerating by a threshold amount and/or for a threshold duration. During the over-run mode, fuel injection to the engine ceases, yet intake air and EGR may continue to be pumped through the engine. By stopping fuel injection, combustion may be temporarily halted, saving fuel during the deceleration (when combustion is not needed to spin the engine). The over-run mode may be detected based on engine speed, load, fuel injection amount, etc.

If the engine is not in the over-run mode, method 200 proceeds to 222, which will be described below. If the engine is operating in over-run mode, method 200 proceeds to 214 to open an EGR valve (e.g., control element 5b of FIG. 1) to route exhaust gas to the intake. During the over-run mode, the engine and exhaust may cool down due to the lack of combustion. By opening the EGR valve to direct EGR to the intake, the engine temperature may be maintained at a relatively high temperature. The EGR valve may be fully opened, or it may be partially opened.

At 216, the intake bypass throttle valve is closed. To provide a desired amount of EGR, the bypass throttle valve may be closed. By closing the bypass throttle valve, the pressure of the intake air may be low enough to allow the desired amount of EGR to be routed to the intake (e.g., the intake pressure may be lower than the EGR pressure). Further, at least a portion of the intake air will then be routed to the engine via the intake turbine, as indicated at 218. At 220, the power generated by the generator coupled to the intake turbine may be routed to the vehicle power grid for use or storage. A further benefit of closing the bypass throttle valve during the over-run mode is that the increased pumping losses associated with throttling the intake air may advantageously act to brake the engine, assisting in the deceleration during the over-run mode.

As stated previously, if the engine is not operating in the over-run mode, method 200 proceeds to 222 to adjust the EGR valve to deliver a desired EGR amount. The desired EGR amount may be based on engine speed and load in one example. To maintain intake air pressure at a level that will allow the desired amount of EGR to enter the intake, as indicated at 224, the bypass throttle valve may be adjusted based on the desired EGR amount. The default position for the bypass throttle may be open, so that all intake air is routed to the engine without passing through the intake turbine. However, if the intake pressure is too high to deliver the desired amount of EGR, the bypass throttle position may be adjusted, for example it may be moved to a more restricted level or closed completely. At 226, the vehicle alternator or other energy generation device may be used to generate electricity, if at least a portion of the intake air is routed through the intake turbine.

Thus, method 200 of FIG. 2 provides for routing intake air through an intake turbine during select conditions, such as during a warm-up phase or DFSO. Further, during conditions where the intake bypass throttle would normally be closed (such as when a high amount of EGR is desired), energy from the intake air may be harnessed by the intake turbine and directed to the vehicle power grid. However, closing the bypass throttle may increase engine pumping losses, offsetting the energy gains associated with the intake turbine. Thus, is some conditions, it may be more energy-efficient to generate power via the vehicle alternator, to avoid the associated pumping losses.

In some embodiments, the engine control system may determine the relative efficiency of closing the bypass throttle and generating electricity using the intake turbine and generator vs. generating electricity from the alternator. The power generated by routing air through the turbine may be determined using the equation:

$$P_T = C_{pe} * T_e * \eta_T (1 - (P_o/P_i)^{(\gamma-1)/\gamma})$$

Where $(P_o/P_i)$ is turbine outlet pressure/inlet pressure, $C_{pe}$ is the coefficient of specific heat capacity (J/kgK), $m_e$ is the turbine mass flow (kg/s), $T_e$ is the turbine inlet temperature, $\eta_T$ is the turbine efficiency, $\gamma$ is the ratio of specific heats, and $P_T$ is the turbine power (W).

Thus, the power generated by the turbine may be calculated. Then, the energy generated by the generator (as driven by the turbine) may be determined (for example, the generator may output 90% of the turbine power in one example) and compared to the power generated by the alternator. If the power generated by the turbine-generator is greater than the alternator, the alternator may shut off to allow energy generation by the turbine-generator.

By generating power through the turbine-generator unit as described herein, engine power, and therefore fuel, may be saved by not using the conventional alternator to generate electricity (as the intake turbine may be more efficient). Additionally, the turbine-generator may allow for heating up of the exhaust during cold engine conditions by loading engine to generate electricity. During DFSO or coasting (with the bypass throttle nearly fully closed, all flow to turbine with maximum expansion), the pressure drop across turbine improves delivery of EGR flow. Further, the turbine-generator may reduce the temperature of the intake air post-intake turbine, increasing the engine power per unit fuel injected and reducing the cooling requirement. Finally, braking and brake disc durability may be increased by utilizing pumping losses rather than convention braking to slow the engine in some conditions.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling an engine having non-transitory instructions stored in a control system to execute:
   during select conditions comprising engine cold start conditions, closing a throttle bypass valve to route intake air to the engine via an intake turbine; and
   routing energy produced by a generator coupled to the intake turbine to a vehicle power grid.

2. The method of claim 1, wherein the select conditions further comprise an engine over-run mode.

3. A method of controlling an engine having non-transitory instructions stored in a control system to execute:
   ceasing fuel injection;
   routing intake air to the engine via a turbine coupled to a generator;
   increasing an exhaust gas recirculation amount directed to the engine via operating an exhaust gas recirculation valve; and
   directing energy produced by the generator to a vehicle power grid during an engine over-run condition for further utilization in driving auxiliary assemblies.

4. An internal combustion engine having at least one cylinder, at least one exhaust line for discharging combustion gases via an exhaust-gas discharge system, and at least one intake line for supplying charge air via an intake system, the internal combustion engine comprising:
   at least one exhaust-gas recirculation arrangement which comprises a recirculation line which branches off from the exhaust-gas discharge system and which opens into the intake system;
   at least one exhaust-gas turbocharger comprising a compressor arranged in the intake system and a turbine arranged in the exhaust-gas discharge system;
   a throttle element which is arranged in the at least one intake line downstream of the compressor;
   a bypass line which branches off from the at least one intake line upstream of the throttle element and which opens into the at least one intake line again downstream of the throttle element; and
   an expansion machine for gaining additional energy arranged in the bypass line;
   a control system including non-transitory instructions executable to adjust the throttle element in the direction of a closed position in order to increase the charge-air flow conducted through the expansion machine, and further including non-transitory instructions executable to in a warm-up phase of the internal combustion engine, adjust the throttle element to conduct a predominant fraction of the charge air through the expansion machine.

5. The internal combustion engine as claimed in claim 4, wherein the expansion machine is an additional turbine.

6. The internal combustion engine as claimed in claim 4, wherein the expansion machine is connected, for the purpose of outputting power, to a generator.

7. The internal combustion engine as claimed in claim 4, wherein a charge-air cooler is provided in the intake system downstream of the compressor and upstream of a point at which the bypass line branches off from the at least one intake line.

8. The internal combustion engine as claimed in claim 4, wherein the recirculation line of the at least one exhaust-gas recirculation arrangement branches off from the exhaust-gas discharge system upstream of the turbine and opens into the intake system downstream of the compressor.

9. The internal combustion engine as claimed in claim 8, wherein the recirculation line opens into the intake system downstream of a point at which the bypass line opens into the at least one intake line.

10. The internal combustion engine as claimed in claim 4, wherein a cooling device is provided in the recirculation line of the at least one exhaust-gas recirculation arrangement in order to cool the exhaust gas to be recirculated.

11. The internal combustion engine as claimed in claim 4, wherein a control element is provided in the recirculation line of the at least one exhaust-gas recirculation arrangement in order to adjust a flow rate of the exhaust gas to be recirculated.

12. The internal combustion engine as claimed in claim 1, further comprising at least one exhaust-gas aftertreatment system which is equipped with an electric heating device which utilizes energy gained by the expansion machine, the at least one exhaust-gas aftertreatment system positioned in the exhaust-gas discharge system.

13. The internal combustion engine as claimed in claim 4, wherein the control system includes further non-transitory instructions executable to, in an over-run mode of the internal combustion engine, adjust the throttle element to conduct a predominant fraction of the charge air through the expansion machine.

14. The internal combustion engine as claimed in claim 13, further comprising a control element provided in the recirculation line of the at least one exhaust-gas recirculation arrangement, and wherein the control system includes further non-transitory instructions executable to, in the over-run mode of the internal combustion engine, open the control element.

15. The internal combustion engine as claimed in claim 4, wherein the expansion machine is connected to a generator in order to output power, and wherein in the warm-up phase of the internal combustion engine, electrical current generated by the generator is utilized for heating exhaust gas.

* * * * *